United States Patent [19]
Kruto

[11] Patent Number: 5,598,863
[45] Date of Patent: Feb. 4, 1997

[54] FLUID FLOW VOLUME SCHEDULING CONTROL SYSTEM

[76] Inventor: Donald Kruto, 431 Easy St., Des Plaines, Ill. 60016

[21] Appl. No.: 508,059

[22] Filed: Jul. 27, 1995

Related U.S. Application Data

[62] Division of Ser. No. 289,622, Aug. 11, 1994, Pat. No. 5,464,038.

[51] Int. Cl.$^6$ .................................................. G05D 7/06
[52] U.S. Cl. ........................ 137/1; 137/624.11; 431/86
[58] Field of Search ........................... 137/487.5, 624.11, 137/624.12, 1, 486; 431/86; 251/129.02

[56] References Cited

U.S. PATENT DOCUMENTS

| | | | |
|---|---|---|---|
| 4,291,860 | 9/1981 | Bauer | 251/129.02 |
| 4,425,930 | 1/1984 | Kruto | 137/624.12 X |
| 4,834,644 | 5/1989 | Snow | 431/86 X |
| 4,867,191 | 9/1989 | Walters | 251/129.02 X |
| 5,126,934 | 6/1992 | Mac Fadyen | 137/487.5 |
| 5,152,309 | 10/1992 | Twerdochlib et al. | 137/487.5 X |
| 5,158,447 | 10/1992 | Geary | 251/129.02 X |
| 5,464,038 | 11/1995 | Kruto | 137/487.5 X |

*Primary Examiner*—Stephen M. Hepperle
*Attorney, Agent, or Firm*—Daryl C. Josephson, Esq.

[57] ABSTRACT

A Fluid Flow-Schedule Control System includes a flow volume regulating subsystem and a control subsystem for determining and maintaining optimal time-based scheduling of fluid flow volume to a fluid actuated host. Together, the subsystems provide a functionally independent system for easy integration with host systems of new manufacture and particularly for retrofit. Fluid flow volume to the host is sensed by and regulated by the volume regulating subsystem according to a continuously variable, schedule sequence. The schedule sequence is preferably determined by a user and\or automatically according to specific time-based flow volume levels and\or by extrapolation from known parameters. Schedule implementation is preferably achieved through control of an electrically controllable, multiple aperture valve or pump according to schedule and/or interactive data and actual volume sensing. Optimization is provided through automatic, complex flow schedule sequencing, usage calculation and usage based schedule and\or schedule sequence review. In its preferred embodiment for use with a furnace host, optimization programs provide for minimal fuel usage without significant loss of heating capability.

3 Claims, 3 Drawing Sheets

FLUID FLOW VOLUME SCHEDULING CONTROL SYSTEM

This application is a division of the application Ser. No. 08/289,622, filed Aug. 11, 1994, now Pat. No. 5,464,038.

BACKGROUND OF THE INVENTION

1. Field of Invention

This invention relates generally to fluid control systems and more particularly to time-based control of fluid volume as it relates to integration with and optimization of fluid-utilizing systems into which this invention is interfaced.

2. Description of Prior Art

Prior to implementation of the existing Kruto method and apparatus, U.S. Pat. No. 4,425,930, fluid flow control was typically accomplished using a simple sense-and-switching means to control a single, normally-closed solenoid valve. One example is the utilization of a thermostatic switch electrically connected to a solenoid valve for gas furnace supply line cycling. Low ambient temperature -signifying a demand for heat- causes the switch to close. Closing of the switch causes the valve to open, thereby supplying the furnace with a single or "maximum", continuous gas flow volume. Gas flow continues until a sufficient supply of heat raises the ambient temperature, causing the switch to open and therefore, the valve to close. Successive demands for heat cause this cycle to be repeated. Other existing supply line as well as numerous other fluid flow control applications were implemented utilizing essentially the same basic apparatus.

Again utilizing gas furnace applications for illustrative purposes, in relevant part, the prior Kruto patent observed that introducing a period of reduced gas flow volume reduces overall fuel consumption without significant impact on warming. Thus, a second, normally-closed, solenoid valve means was added to the supply line to provide three independently selectable fluid flow volumes: no flow (both closed); maximum flow (both open); and minimum flow (only the existing valve is open). Two thermostatically and sequentially triggered, valve-specific timers were also added for simple, automatically scheduled fluid volume switching within the conventional thermostatic cycle. Closing of the thermostatic switch thus results in a first interval of maximum fluid flow volume, a second interval of minimum fluid flow volume and -should the switch remain closed indicating continued demand- a third interval of maximum fluid flow volume. Again, the same basic apparatus with minimal, rather obvious modification is equally applicable to numerous other control applications.

While the Kruto apparatus produces positive results, as with many early attempts to implement a generalized concept based upon preliminary findings, numerous practicalities were overlooked. For example, the apparatus is not a functionally independent module. User control and interfacing is limited to manual presets for the two discrete timers, powered uninterrupted maximum flow or "apparatus bypass" and conventional sense\switching means manipulation- in this illustration, thermostatic switch (overall cycle length) adjustment. No means for immediate feedback is provided, including for adjustments made. These oversights present a number of key disadvantages.

One disadvantage of the prior Kruto apparatus is its difficult installation. Extensive technician support is needed for connection to the existing sense-switching means, replacement of the existing valve system and both initial and repeated manual adjustment for system-specific optimization. While this is especially true of retrofit applications, new manufacture also suffers due to the variety of system configurations and time-varying, user-specific requirements.

A second disadvantage of the prior Kruto apparatus is the lack of an effective feedback means for alerting even a technician as to proper adjustment for maximum efficiency. Thus optimal efficiency, particularly for non-standard systems, can only be determined by review of fuel consumption statistics and host-system effectiveness over an extended period of time.

A third disadvantage of the prior Kruto apparatus is that fluid flow volume is not optimizeable either individually or in conjunction with timer variation to provide an optimal fluid flow efficiency versus host-system effectiveness compromise. While the "optimal" minimum-to-maximum fluid flow volume ratio can vary based upon the initial system configuration and various modifications, the "actual" ratio is chosen during manufacture based upon the specific valves chosen. The utilization of two discrete valves further erroneously assumes a two or three period optimal schedule.

Compounding these disadvantages is the control means itself. Essentially blind manual manipulation in proximity to, for example a furnace, combined with a complex, wait-and-see type statistical and usability analysis, unavailability of analytical equipment and related expense realistically preempts achieving optimal or even near-optimal system performance.

A fourth disadvantage of the prior Kruto apparatus is that discrete timers and normally closed, two-state valve means are necessarily utilized. The discrete timers are inherently prone to inaccuracies. Given the lack of immediate feedback and correction means, these inaccuracies may well go unnoticed despite a decrease in overall system performance. In addition, the normally-closed valve means require power in order to eliminate apparatus interference with the overall system. Thus diagnosis and even safety may well be compromised in the event of a system and\or apparatus failure.

A fifth disadvantage of the prior Kruto apparatus is that no means is provided for remote monitoring, analysis, control and other automation-enabling capabilities, many of which are discussed in more detail below.

SUMMARY OF THE INVENTION

While utilizing generally the time-based, fluid volume control concept disclosed in the prior Kruto patent, the present invention is a somewhat radical departure. The present invention is intended to provide a more practical, complete and reliable time-based, fluid-flow volume scheduling apparatus. In addition, it is intended to provide a practical means for remote access, monitoring and analysis as well as other capabilities associated with the broad concept of appliance automation. To accomplish these and other goals, the invention comprises both a new electro-mechanical subsystem and a microprocessor-based, on-site and remotely accessible, electronic subsystem. Together, these subsystems provide for easy system installation, monitoring, control and optimization for both integration into new manufacture and for retrofit.

It should be noted that while the embodiments presented focus on gas furnace applications for illustration purposes, the present invention is obviously equally applicable to numerous heating, appliance and other fluid flow volume. Scheduling control applications utilizing a wide variety of fluid compositions.

One object of the invention is to provide a fluid flow volume control system that is essentially an independent, functional unit, thereby providing for easy installation and host system integration both with regard to new manufacture and retrofit. All monitoring and control functions are therefore provided by the invention itself.

A second object of the invention is to provide a fluid flow volume control system in which time-scheduling of fluid flow volume is easily, reliably and continuously optimizeable. Given the variety of fluid flow volume control applications, host system permutations and ever-changing user requirements, both the number and duration of volume-determining intervals must be continuously and accessibly alterable.

A third object of the invention is to provide a fluid flow volume control system in which the system default state is one in which the system is bypassed entirely. Thus, the results of an always possible control system failure are essentially limited to loss of control system benefits rather than loss of host system benefits as well. For example, a furnace host system will continue to operate normally.

A fourth object of the invention is to provide a fluid flow volume control system with easy manual and automated, on-site and remote control of system functions. Such control provides for practical system monitoring, control and optimization. In addition, such features as remote fluid supply billing, maintenance alerting, integration with other "smart" systems and other automation-enabling features are readily available.

A fifth object of the invention is to provide a fluid flow volume control system in which the fluid flow volume itself can be optimized, preferably in a continuously variable manner, but in any case according to a time schedule as is described above.

These and other objects, advantages, features and benefits of the present invention will become apparent from the drawings and specification that follow.

DETAILED DESCRIPTION OF THE PREFERRED EMBODIMENT

Figure 1:
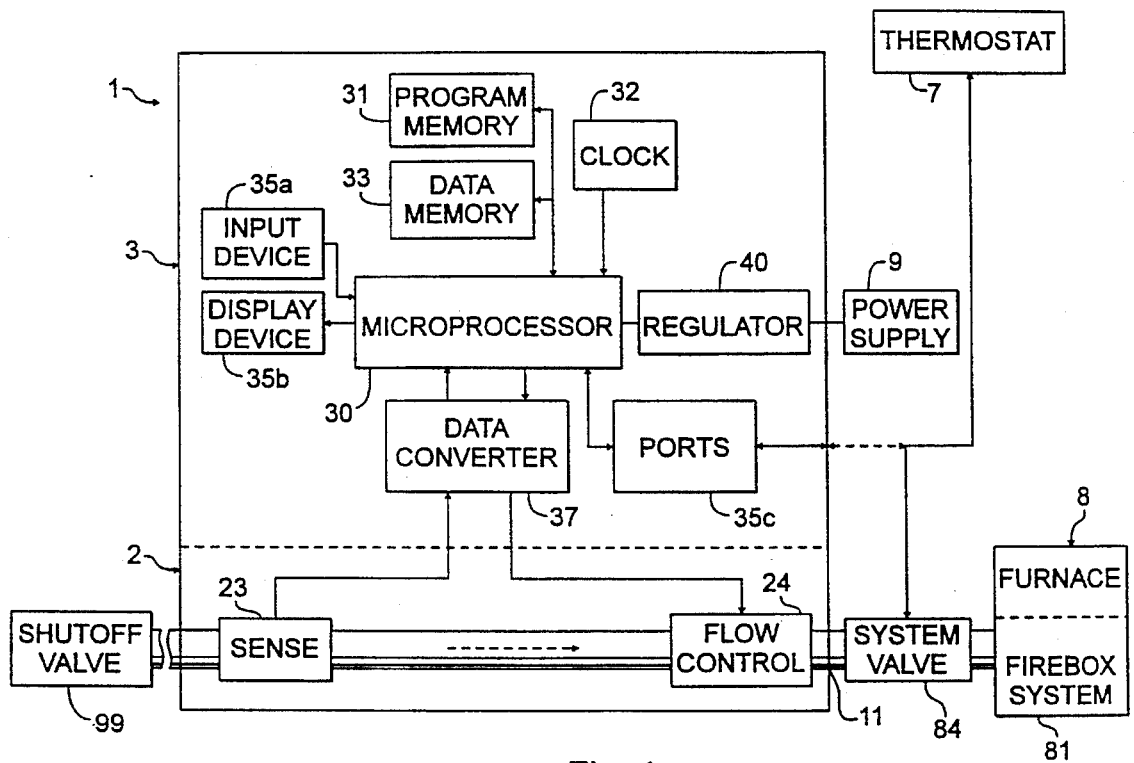
FIG. 1 is a functional diagram of the preferred Fluid Flow Volume Scheduling Control System (FFCS) showing components and connections for gas furnace applications.
Figure 1A:
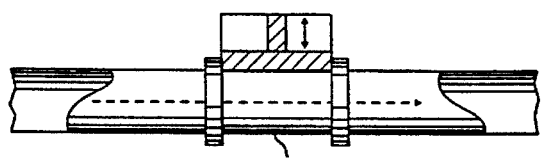
FIG. 1a is a partial functional diagram of the preferred FFCS showing the use of a normally open flow control valve such that the risk of interference with normal host system operation upon FFCS failure is minimized.

FIG. 1 and FIG. 1a show that the preferred Fluid Flow Volume Scheduling Control System (FFCS) is essentially an autonomous flow volume scheduling system for determining and implementing a flow schedule to a host system, such as a gas furnace 8, wherein an optimal compromise between fluid flow volume and host effectiveness is maintained. In order to provide foe easy new manufacture and particularly retrofit installation autonomous operation and manual, remote and automated flow schedule monitoring and optimization, the FFCS 1 comprises both fluid handling 2 and control 3 subsystems.

The electro-mechanical, fluid-handling subsystem 2 comprises a conventional, electrically monitorable, fluid flow pressure or sense-valve 23 and a conventional, electrically operable, aperture, normally-open, flow-control valve 24 (FIG. 1a). Both are electrically connected to the control system 3. Operationally, normal fluid flow to the furnace 8 is detected by the sensor-valve 23, which alerts the control system 3; the control system 3, where appropriate, electrically addresses the flow-control valve 24, thereby selecting a specified flow-control valve 24 aperture and thus selectively restricting fluid flow volume to the FFCS outlet 11.

The electronic control system 3 is most easily understood in terms of functionality. A microprocessor 30 provides a number of functions. As a plurality of timers and flow volume manager, it acts through a conventional analog-to-digital and digital-to-analog conversion module or data converter 37, reacting to flow data received from the sense-valve 23 by storing flow data and sending aperture selections to the flow-control valve 24 based upon a pre-determined schedule stored in data memory 33. As a communications manager, it acts through a conventional I\O controller, receiving, storing and transmitting data between program memory 31, data memory 33, a data input panel 35a, a display panel 35b and -for remote data transfer- at least one conventional serial port 35c. In order to assure data integrity in the event of a power failure and to allow for program and data updates, both program memory 31 and data memory 33 are comprised of conventional read\writable, non-volatile memory. A system clock 32 further provides for time and date stamping of stored data.

The electrical and mechanical independence of the FFCS 1 is desirable for a number of reasons, beginning with installation. Electrically, the FFCS 1 needs only be connected to an available conventional power source 9. A conventional, automatically switching power regulator 40 supplies the microprocessor 30, interface and support components, as well as the sense 23 and flow-control 24 valves. Connection to the thermostat 7 is not required since the start of flow, flow rate and end of the thermostatic cycle are detected by the sense valve 23; however, optional utilization of such connection is provided for. Mechanically, the FFCS 1 is connected as would a section of pipe. The use of a flow sense means 23 and a normally open control-valve 24 allows utilization of the existing thermostatically controlled system-valve 84 and thus, easy connection between the system-valve 84 and the furnace firebox system 81.

FFCS 1 independence also provides a high degree of power failure tolerance, reliability and safety. The use of a normally open flow-control valve 24 assures that removal of power to the FFCS 1 does not impede the normal flow of gas to the host furnace 8. The use of non-volatile program 31 and data 33 memory further assures that scheduled fluid flow volume will continue once power is restored and that stored flow data will not be lost.

Figure 2:
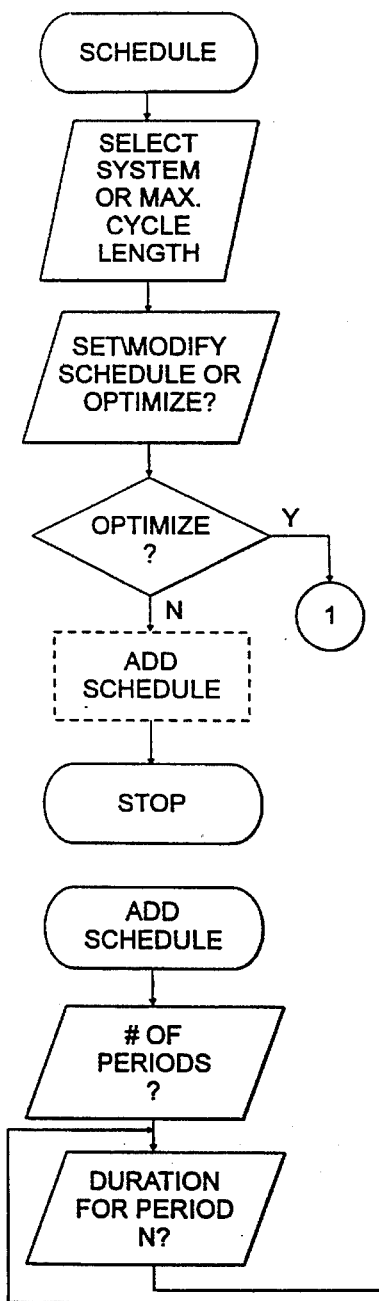
FIG. 2 is flow chart showing user entry of sequential fluid supply schedule steps to be executed on a cyclical, fluid volume per time period basis according to a preferred embodiment of the present invention.

System independence also greatly simplifies system and need specific optimization. As shown in FIG. 2, basic preset fluid flow volumes and time-period-per-volume information are preprogrammed. Selection of a preset schedule and further optimization can be effectuated directly utilizing the data input panel 35a and display panel 35b as an operator interface for microprocessor 30 control and data memory 33 storage. Remote control can also be utilized. A conventional switching thermostat 7 can be utilized for schedule incrementing as is described below. In addition, complete remote access is provided through the connection of a digital thermostat, controller, portable computer, printer, modem, etc. to an available serial port 35c; for security reasons, remote access to specific functions must be affirmatively enabled to allow such access. Specific scheduled fluid volume changes can selectively be implemented either permanently to adjust for system peculiarities or for temporarily meeting increased need for heat.

The optimal fluid delivery schedule for a gas furnace is one that utilizes minimum fluid volume to sufficiently satisfy the demand for heat. But while it is known that a first period of maximum flow volume followed by a second period of a lesser flow volume is one efficient solution, the specific time periods and fluid volumes for optimal performance are variable based upon the heating system and user preferences. In fact, the optimal schedule may require many periodic subdivisions or even continuous change, as can only be determined by extended variation, data sampling and analysis. Therefore, as further shown in FIG. 2, the microprocessor 30 and sense-valve 23 combination allows the FFCS 1 to selectively store successive optimization attempts for later analysis, and to calculate fluid usage for such determination. Therefore, the clock 32 is selectively polled by the microprocessor 30 for storage of the time and date of each such change. Of course, such determination can also be made remotely, if enabled, through the addition of the serial port 35c.

Figure 3:
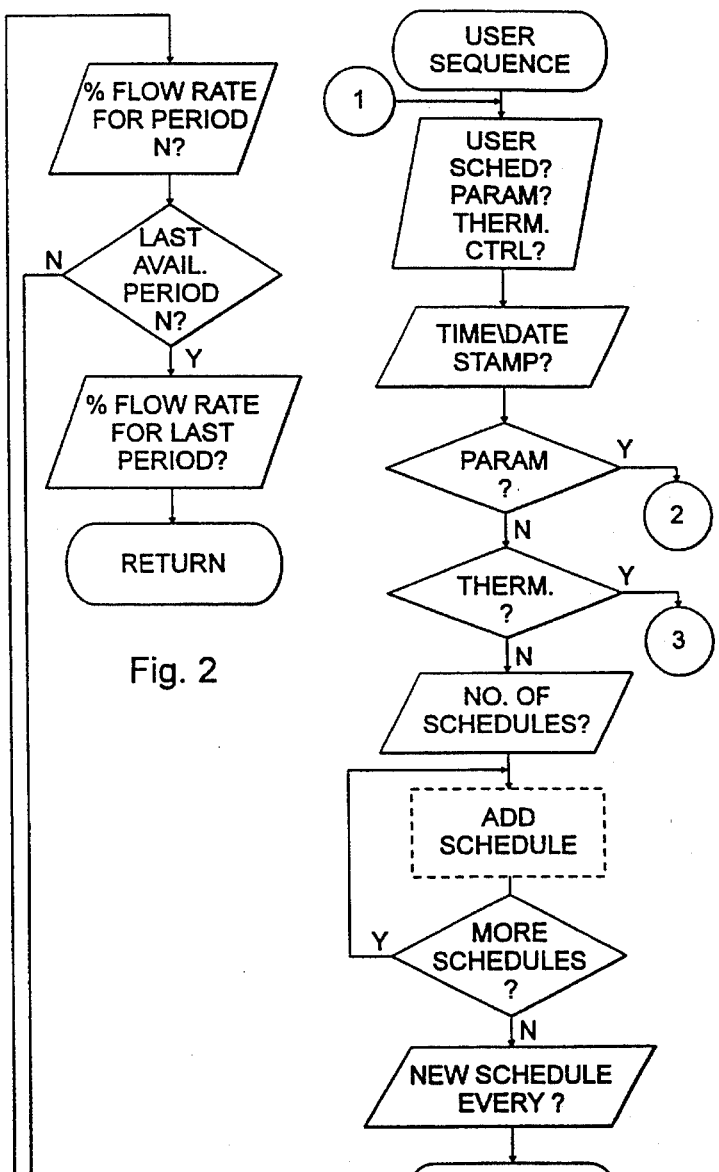
FIG. 3 is a flow chart showing user selection of desired flow schedules for sequential execution and optionally sequential steps within such schedules or parameters for automatic generation of such sequential steps, such that a schedule providing optimal fluid usage versus effectiveness might be ascertained from execution of such sequence of schedules either once or cyclically, according to a preferred embodiment of the present invention.
Figures 4, 5:
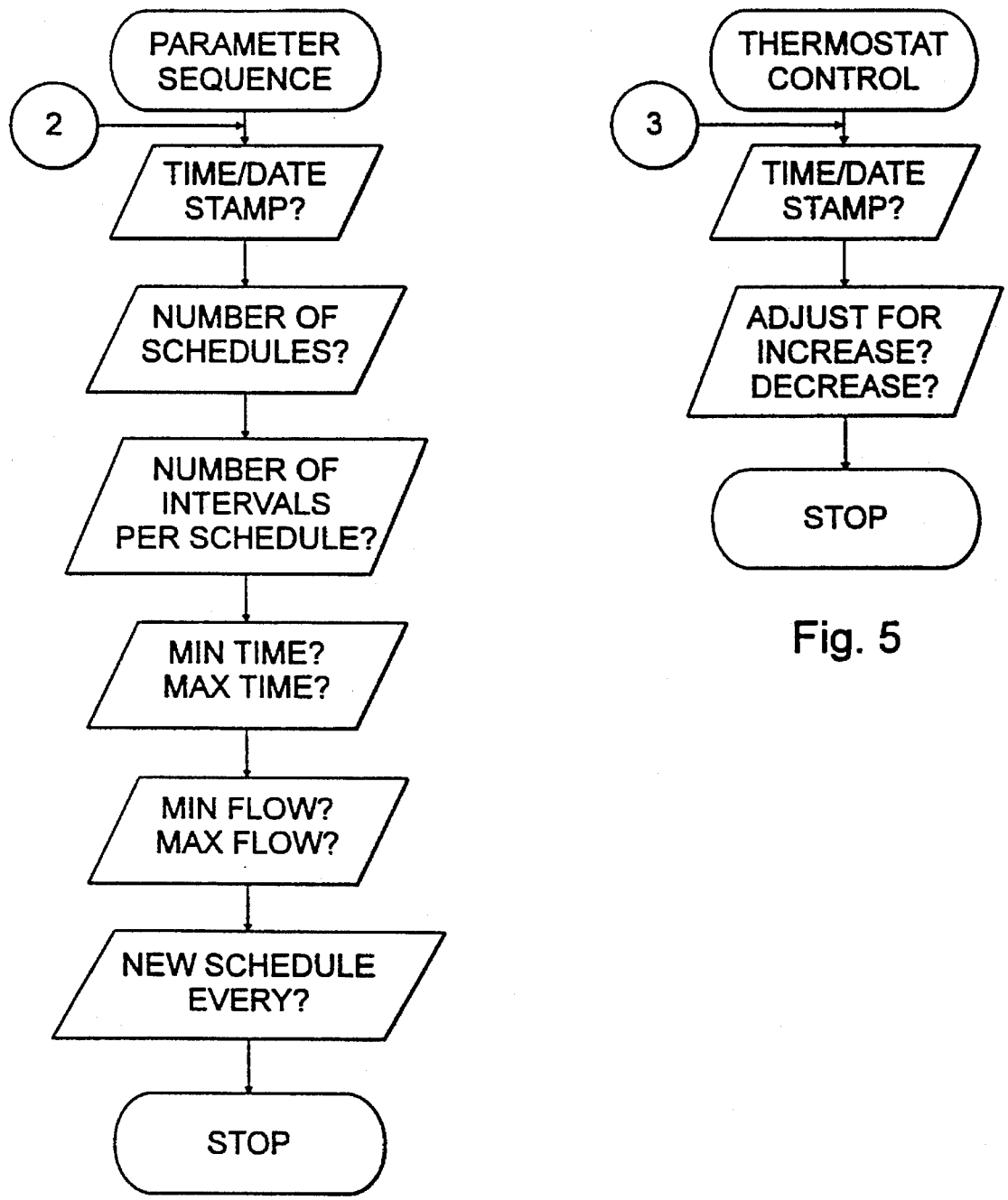
FIG. 4 is a flow chart showing user entry of parameters bounding a user determined number of flow schedules to be automatically generated for sequential execution either once or cyclically, according to a preferred embodiment of the present invention.
FIG. 5 is a flow chart showing user entry of control information for allowing control of the FFCS flow volume per unit time scheduling through manipulation of a conventional thermostat, according to a preferred embodiment of the present invention.

FIGS. 3 through 5 show that, in addition, the microprocessor 30 can be used to aid in selection of the optimal fluid flow volume schedule. During installation, a technician can store either a series of optimal schedule approximations (FIG. 3) or simply a known optimal schedule range into data memory 33 (FIG. 4) for sequential execution at timed intervals, for example, one schedule per week. If enabled for sequential execution of sequential schedules, the microprocessor 30 will implement each schedule and store the appropriate start date for each upon start of execution. The user can later instruct the processor to calculate and display fluid usage from minimum to maximum volume and then simply select an acceptable compromise between usage and comfort level. Alternatively, the microprocessor 30 can be used in conjunction with the optional thermostatic connection. In this case, stored or calculated schedules are incremented in response to user thermostat 7 manipulation. (FIG. 5). Both features effectively eliminate the need for further technical support for system optimization.

Remote monitoring, billing, maintenance alerting and other automation-enabling features are also provided utilizing remote access polling in essentially the same manner as with remote optimization as described above.

While the above description contains many specificities, these should not be construed as limitations on the scope of the invention, but rather as an example of the preferred embodiment thereof. Many other variations are possible within the spirit and scope of the present invention.

Figure 1B:
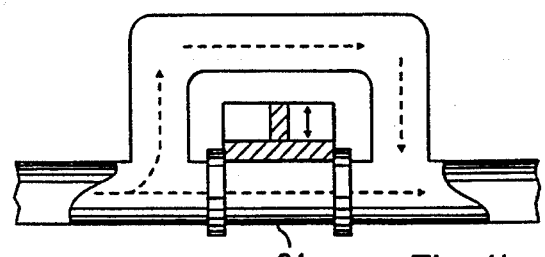
FIG. 1b is a partial functional diagram of the FFCS showing an example of the use of multiple apertures either within or without the control valve, in this case showing the use of a second aperture and additional conduit to allow a minimum fluid flow volume arriving at the control valve to reach a host system essentially unobstructed at all times.

For example, the continuously variable aperture, flow-control valve 24 is preferred since it provides for complete fluid flow volume variation and thereby, optimal performance. However, a conventional multiple aperture valve or conduit switching valve can be used to provide a host supply line with varying fluid flow volume according to a scheduled sequence, though optimization is somewhat compromised by discrete flow volume output switching versus continuous output adjustment. Further, a conventional bypass means, such as an additional valve aperture, a valve-bypass conduit and\or a valve closure maximum of less than one hundred percent can be used to assure allowance of at least a minimal fluid flow volume between the FFCS 1 supply line and a host system without adversely impacting FFCS 1 operation (FIG. 1b). The sense valve 23 and flow-control valve can similarly be combined without significant impact on system operation.

A second example is that, as with almost all microprocessor-based systems, component selection represents an application specific balance. In addition, specific functional subdivision is often inconsequential. For example, nonvolatile memory is preferred based upon its inherent power down tolerance, the typical availability of a power source and avoidance of the problems associated with changing an on-board battery; however, a remote power supply such as a battery can be used. In addition to powering memory, such an on-board supply can power all electronic components as well as a low power fluid-control valve for remote fluid flow volume control applications. The use of read only memory for cost saving purposes is also anticipated. A single serial communications port represents an attempt to minimize cost while maximizing compatibility; however, one or more ports of various types are anticipated, as is an internal modem. The microprocessor 30 is utilized as a timer due to its availability, low workload and multiple timer emulation capability; however, timing circuitry can be used. Other obvious modifications and levels of integration are anticipated in order to decrease size and cost, and to take advantage of the microprocessor availability. Similarly, specific software flow is obviously variable; for example, program 31 and data 33 memory are updatable to accommodate flow control parameters for a given specific host system.

A third example is that a retrofit gas furnace host was chosen merely for illustrative purposes. The present invention is also specifically intended for oil burning applications in which the flow-control valve 24 is replaced by an electrically controllable pump. The FFCS 1 is also specifically intended for use with numerous other fluid flow hosts requiring control of input or output fluid flow volume, both as a retrofit to existing host systems and for integration with new systems during manufacture. Further, its use with other fluid compositions is almost inevitable.

Other variations are, of course, also within the spirit and scope of the present invention.

I claim:

1. A method for providing a time scheduled sequence of fluid flow volumes of fuel to a burner of a host heating appliance and thereby delivering a minimal fuel volume per unit time within each normal host supply cycle and with minimal compromise of heating effectiveness that is easily integrated with a new manufacture and for retrofit comprising placing an electrically controllable, normally open fluid flow volume regulating valve in line with a host heating appliance supply line, scheduling the regulating valve electrically with a microprocessor and controlling the microprocessor with a sequencing program and data comprising a sequence of fuel flow volumes per unit time.

2. A method for providing a time scheduled sequence of fluid flow volumes of fuel to a burner of a host heating appliance as defined in claim 1 further comprising determining the sequence of fuel flow volumes per unit time selectively by selecting preset schedules, entering specific flow rates per unit time, entering preset bounding parameters for microprocessor calculation of flow rates per unit time and manipulating a conventional thermostatic control, maximum fuel flow to a host heating appliance burner coincident with igniting of the burner within each normal host cycle being assured by deliniating non-overrideable, limiting, valve means aperture selectability constraints.

3. A method for providing a time scheduled sequence of fluid flow volumes of fuel to a burner of a host heating appliance as defined in claims 1 or 2 further comprising utilizing a microprocessor and corresponding communication and display means for electronically determining, reporting and utilizing, both locally and remotely, fluid supply and consumption information, fluid flow scheduling information, billing information, electronic payment transfer, multiple system and device coordination, operation and usage information, maintenance information, manual and electronic payment information and other information commonly referred to as smart house operation.

* * * * *